United States Patent
Mamaysky et al.

[19]

[11] Patent Number: 6,026,678
[45] Date of Patent: Feb. 22, 2000

[54] SURFACE FINISH, DISPLACEMENT AND CONTOUR SCANNER

[75] Inventors: Margarita Mamaysky, Pawtucket; Albert Coutu, Johston, both of R.I.

[73] Assignee: Mahr Federal, Inc., Providence, R.I.

[21] Appl. No.: 09/361,799

[22] Filed: Jul. 27, 1999

[51] Int. Cl.[7] .................................................. G01B 5/28
[52] U.S. Cl. ............................................................. 73/105
[58] Field of Search ............................. 73/105; 33/DIG. 1

[56] References Cited

U.S. PATENT DOCUMENTS

| | | | |
|---|---|---|---|
| 2,396,394 | 3/1946 | Shaw | 73/105 |
| 2,421,578 | 6/1947 | Reason | 73/105 |
| 2,631,272 | 3/1953 | Smith | 73/105 |
| 3,070,742 | 12/1962 | Smith et al. | 73/105 |
| 4,574,625 | 3/1986 | Olasz et al. | 73/105 |
| 4,736,208 | 4/1988 | Schmidt | 73/105 |

*Primary Examiner*—Hezron Williams
*Assistant Examiner*—Michael Cygan
*Attorney, Agent, or Firm*—Morse & Altman

[57] ABSTRACT

A surface finish, displacement and contour scanner comprising an arm with a stylus pivotally attached to a housing, and a transducer with a blade attached to the arm and an E-shaped ferrite core mounted to the housing. The arm is biased with the stylus out of the housing. The high permeability blade moves outside of the core, relative to the open faces of the three legs of the core. The blade is a flux carrier changing the coupling between the primary winding and the secondary windings, controlling the secondary windings output signals. The blade has a section adjacent to and completely covering the primary leg face, and two sections adjacent to the secondary leg faces. In the null position, both leg faces are half covered so that the secondary windings outputs are the same. As the stylus moves, the area of one secondary leg face covered by the blade increases as the other decreases, changing the secondary winding output signal in opposite directions.

9 Claims, 5 Drawing Sheets

SURFACE FINISH, DISPLACEMENT AND CONTOUR SCANNER

BACKGROUND OF THE INVENTION

1. Field of the Invention

The present invention relates generally to surface analysis systems and, more particularly, to a high-precision surface finish, displacement, and contour scanner.

2. The Prior Art

Generally, a surface finish, displacement, and contour scanner, frequently referred to as a probe, is designed for use in a surface analysis system which is used to measure, compute, display and record linear profile and surface finish characteristics, for displacement measuring without traverse, and to perform electronic gauging. "Traverse", as used in this specification and in the appended claims, is meant to define a relative stylus motion which is parallel to the surface being measured. Such surface analysis systems are well known in the art and have been employed for a variety of laboratory and quality-control tasks. Their general applications, for example, include the surface measurement of the inside and the outside diameters of manufactured parts, of gear-teeth profiles, of grooves and of flats. Surface analysis systems readily detect such surface irregularities as bell mouth, runout, taper, roughness and waviness. Surface analysis systems also compute, display and record roughness averages (Ra) of measured surfaces. Roughness average (Ra) is an arithmetical average deviation, usually expressed in microinches or micrometers, and measured normal to the surface. Surface analysis systems are especially useful for measuring deposits on thick and thin-film microelectronic components, i.e., for electronic gauging.

An arm 100 and transducer 102 of a typical prior art probe is shown in FIG. 1. The arm 100 employs a stylus 104 and is mounted cantilever style in a casing, not shown. The transducer 102 includes a thin, flat high permeability blade 106 at the end of the arm 100 that is designed to be accommodated within three collinear slots 110 of an E-shaped ferrite core 108 or other suitable material. The blade 106, accommodated as it is within the slots 110, functions as a movable "flux carrier" whose slightest relative displacement within the slots 110 effectively changes the area of the air gap to control the relative magnitudes of flux produced in two magnetic circuits 114, 116 by an AC-energized primary winding 112, in a manner similar to the operation of the transducer disclosed in U.S. Pat. No. 2,631,272, granted Mar. 10, 1953 to Smith. In short, when the blade 106 is centered vertically in the slots 110, the lines of flux between the two poles of the upper secondary winding 114 and the lines of flux between the two poles of the lower secondary winding 116 are equal. The result is that the difference in signal output between the two secondary windings is zero. As the blade 106 moves upwardly or downwardly from the center position, the lines of flux between the poles of the upper winding 114 change from that of the lower winding 116. The result is that the signal output from the upper winding 114 differs from the signal output of the lower winding 116. Whether the difference is positive or negative depends upon the excitation signal of the primary winding 112 and whether the blade 106 is moving upwardly or downwardly. In any case, if an upward movement causes a negative difference, a downward movement causes a outputs of the two windings 114, 116 is used to determine the displacement of the stylus 104.

A shortcoming of this prior art design is the care needed to manufacture and calibrate the device. In order to ensure symmetry in the secondary winding outputs, the parameters of the collinear slots 110 must be carefully controlled. This results in an added burden in the manufacturing process. Also, the slots 110 are made very narrow to produce a larger change in secondary winding output for smaller movements of the blade 106. It is more difficult to manufacture and calibrate the device when the thickness of the blade 106 approaches the width of the slots 110. Finally, the narrowness of the slots 110 makes it more likely that the blade 106 will make contact with the core 108. Not only does this affect the electrical properties of the transducer 102, but it adds mechanical friction to the movement of the stylus 104, further affecting the measurement.

SUMMARY OF THE INVENTION

An object of the present invention is to provide a surface finish, displacement, and contour scanner with a simpler transducer mechanism that is easier to manufacture.

Another object is to provide a contour scanner that is easier to maintain during its lifetime by being easier to calibrate.

A further object is to provide a contour scanner that is less likely to be affected by errant movements of the transducer components.

The surface finish, displacement and contour scanner, or probe, of the present invention comprises a stylus, a transducer for measuring the displacement of the stylus from a "null" position, an arm for pivotally supporting the stylus in operative engagement with the transducer, and a housing. The transducer includes a blade attached to the arm and a three-winding core attached to the housing.

There are three general configurations for the blade, stylus, and pivot. In the first and preferred configuration, the stylus and blade are at opposite ends of the arm with the pivot in between. In the second, the stylus and pivot are at opposite ends with the blade in between. And in the third, the pivot and blade are at opposite ends and the stylus is in between. Unless otherwise noted, the remainder of the specification assumes the first configuration.

The housing supports the arm and transducer in fixed positions relative to each other. The housing is generally cylindrical, with a slot into which the arm loosely fits. The pivot attaches the arm to the housing. Any practical means for providing the pivot is contemplated by the present invention. In one means, the pivot is a sheet of spring steel attached between the arm and housing. The spring biases the arm out of the housing, and is preferably easily adjustable.

The blade is composed of a high permeability material, and moves relative to the faces of the three legs of an E-shaped ferrite core. Each leg of the core has a winding. The blade acts as a flux carrier whose relative displacement changes the coupling between the AC-energized primary winding and the secondary windings to control the relative magnitudes of flux produced in the two secondary windings and, consequently, affects the output signals of the secondary windings.

The transducers of the prior art use a blade between opposing poles within a set of collinear slots in a closed measurement loop arrangement. The blade acts as a barrier for flux lines between opposed poles of the same winding must be carefully controlled to operate properly and consistently. The present invention uses an open measurement loop design where the blade is positioned outside of the core. The blade is potentially farther from the core and less likely to have physical contact with the core. The exact position of the blade is much less crucial than for the closed measurement loop transducers. As long as the gap between the blade and the core remains constant, measurements will be accurate.

The blade has three sections, the center section adjacent to and covering the primary leg face, the inner section adjacent to the inner secondary leg face, and the outer section adjacent to the outer leg face. Preferably, in the null position, both leg faces are half covered so that the amount of coupling to each of the secondary windings is the same. As the stylus moves upwardly, the blade moves downwardly, uncovering more of the inner leg face and covering more of the outer leg face, leading to a difference in output signals between the two secondary windings that is measured to determine the displacement of the stylus.

The output signals can be sent to the measurement circuitry independently, where the difference between magnitudes is determined. Alternatively, and preferably, the secondary windings are wound in opposite directions and are wired in series. A single directly representing the displacement is sent to the measurement circuitry. When the stylus is in its null position, the secondary windings have equal and opposite output signals, canceling each other out.

An oscillator provides an AC excitation to the primary winding. The signal from the secondary windings is amplified, demodulated, filtered, amplified again, digitized, and sent to a computer for calculation.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

The surface finish, displacement and contour scanner, or probe, of the present invention generally comprises a stylus 12, a transducer 14 for measuring the displacement of the stylus 12 from a "null" position, an arm 16 for pivotally supporting the stylus 12 in operative engagement with the transducer 14, and a housing 18. The stylus 12 may be any known stylus, such as a diamond stylus, a sapphire chisel stylus, a ruby ball, a carbide ball, or the like. The transducer 14 is designed to give true displacement transducer operation with light stylus contact force, and produce readouts with or without traverse motion by the stylus 12. The transducer 14 is more fully described below.

Figure 1:
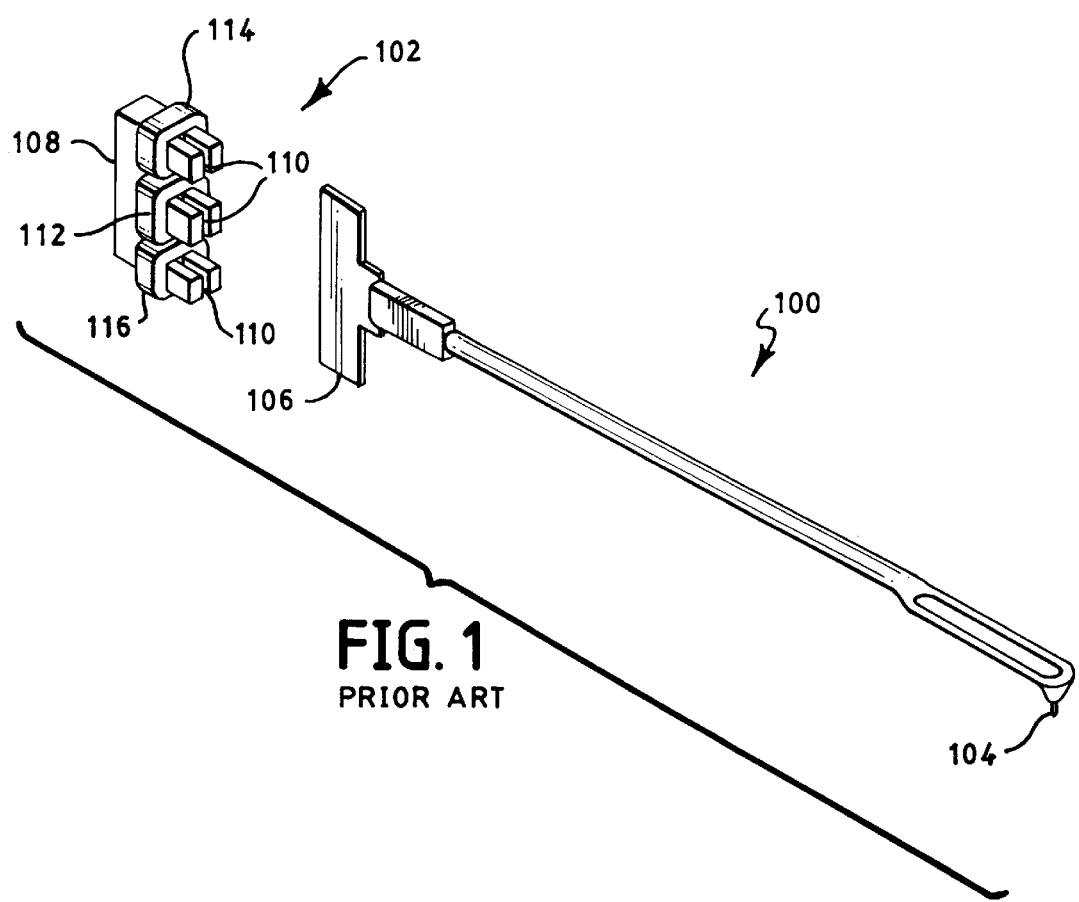
FIG. 1 shows a partially exploded view of an arm and transducer of a surface scanner of the prior art.
Figure 2:
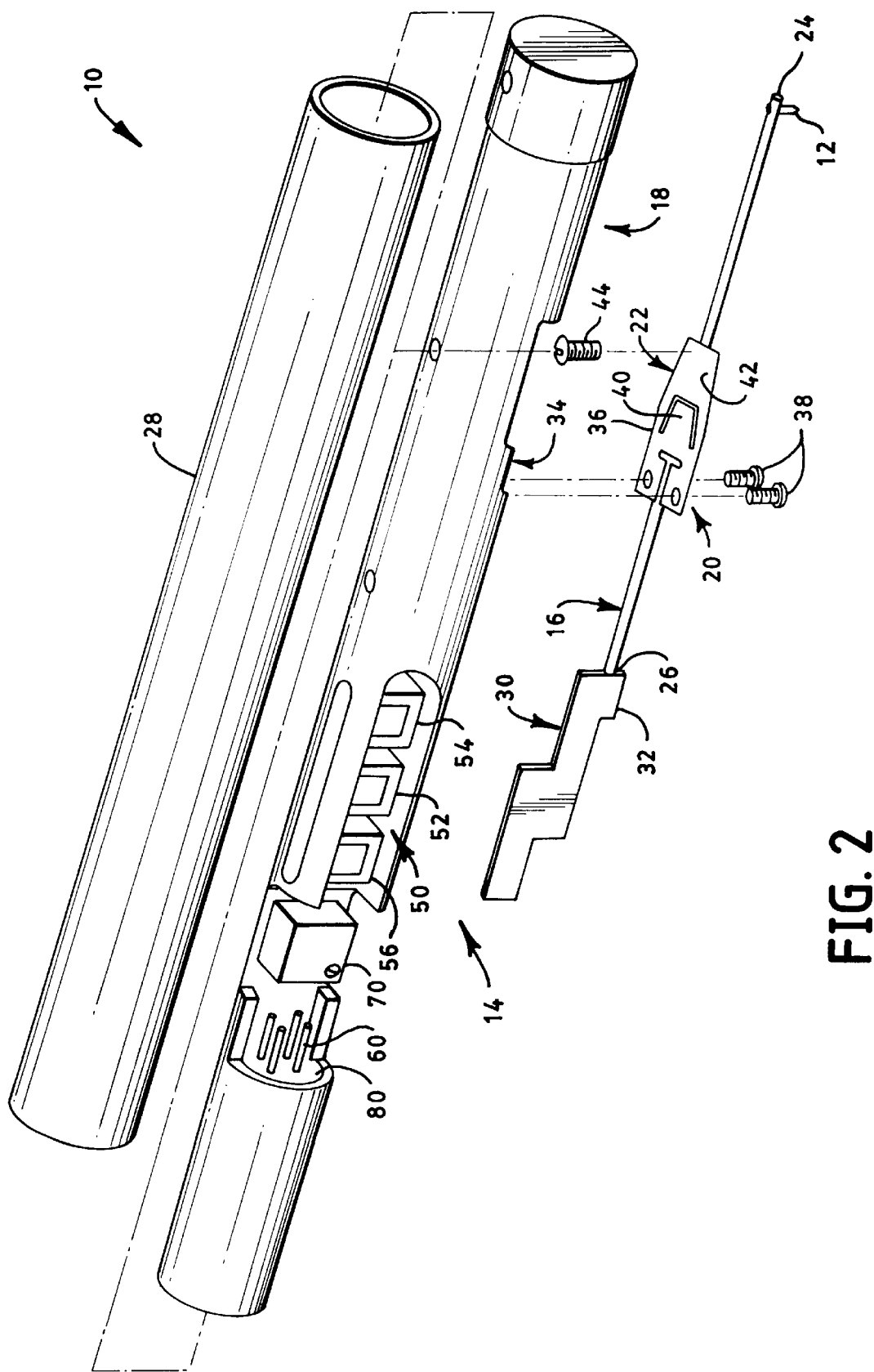
FIG. 2 shows an exploded perspective view of the preferred configuration of a contour scanner of the present invention.
Figure 6:
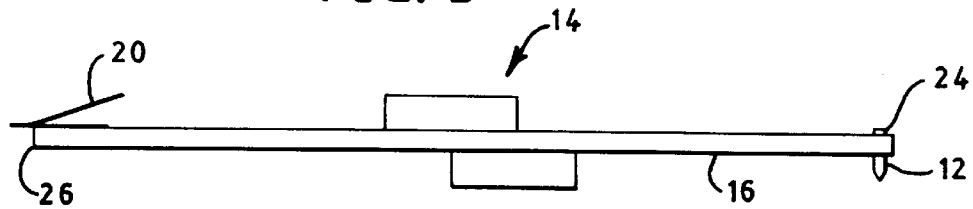
FIG. 6 shows a side view of the arm of a second configuration of the contour scanner of the present invention.
Figure 7:
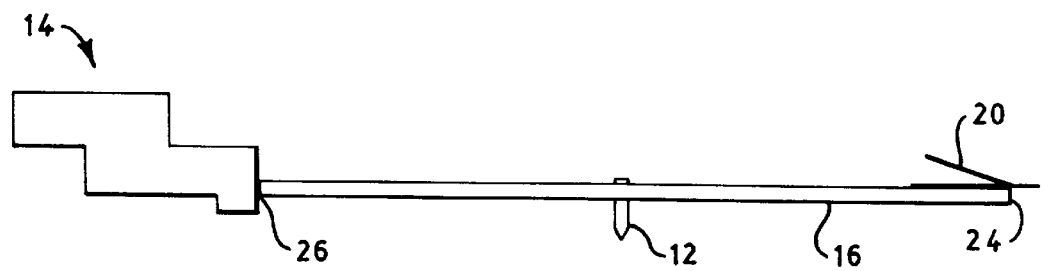
FIG. 7 shows a side view of the arm of a third configuration of the contour scanner of the present invention.

There are three general configurations for the locations of the transducer 14, stylus 12, and pivot 20 on the arm 16. In the first and preferred configuration, shown in FIG. 2, the stylus 12 is at one end 24 of the arm 16, the transducer 14 is at the other end 26 of the arm 16, and the pivot 20 is between the stylus 12 and transducer 14. In the second configuration, shown in FIG. 6, the stylus 12 is at one end 24 of the arm 16, the pivot 20 is at the other end 26 of the arm 16, and the transducer 14 is between the stylus 12 and pivot 20. In the third configuration, shown in FIG. 7, the pivot 20 is at one end 24 of the arm 16, the transducer 14 is at the other end 26 of the arm 16, and the stylus 12 is between the pivot 20 and transducer 14. Unless otherwise noted, the remainder of the present application assumes the first configuration.

The stylus 12 is carried at one end 24 of the arm 16 and is preferably lightly press-fitted into the arm 16. Alternatively, the stylus 12 is cemented in place by a suitable cement, such as an epoxy glue, a cyanacrylate glue (an anaerobic material), or the like. Preferably, the arm 16 is of tubular construction and formed of a non-magnetic material, such as aluminum. The other end 26 of the arm 16 is adapted to mate with a projecting portion 32 of a blade 30 used to measure the displacement of the stylus 12, as described below.

Figure 3:
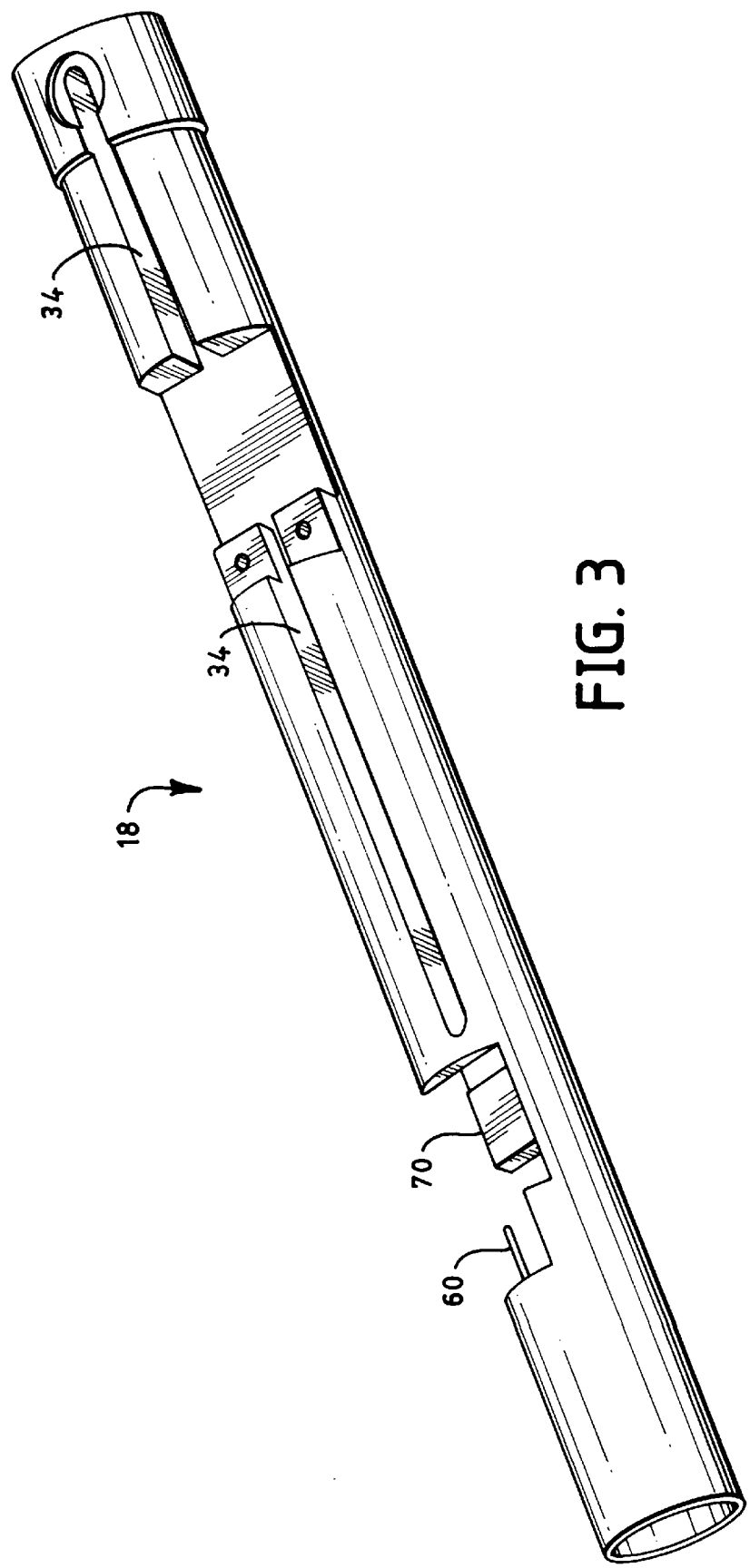
FIG. 3 shows a bottom view of the housing of FIG. 2.

The housing 18 provides a means for supporting the components of the probe 10 in fixed positions relative to each other and to protect the arm 16 from damage. In one configuration, the housing 18 is generally cylindrical. As shown in FIG. 3, it has a slot 34 in the outer surface that is parallel to the housing axis. The arm 16 fits loosely within the slot 34. The pivot 20 is attached to the arm 16 and housing 18 so that as one end of the arm 16 moves away from the housing axis, the other end of the arm 16 moves toward the housing axis. Any practical means for providing the pivot 20 is contemplated by the present invention. One means is illustrated in the figures. The arm 16 is permanently attached by, for example, laser weldment, to a flexible sheet 36 of spring steel, and the sheet 36 is attached to the housing 18. Preferably, the sheet 36 is removably attached to the housing 18, for example, by screws 38, for maintenance purposes.

The spring 22 provides a means for biasing the arm 16 out of the housing 18. The preferred spring 22 is a leaf spring because it is easily adjustable. In the disclosed embodiment, the spring 22 is incorporated into the flexible sheet 36 providing the pivot 20. The sheet 36 is cut to provide an inner portion 40, to which the arm 16 is attached, and an outer portion 42 that provides a means for adjusting the tension of the spring 22. A screw 44 provides a stop against which the outer portion 42 abuts, and the amount by which the screw 44 extends into the slot 34 determines the spring tension.

Preferably, the combined housing 18 and arm 16 is enclosed in a sheath 28 to protect the moving components.

Figure 5:
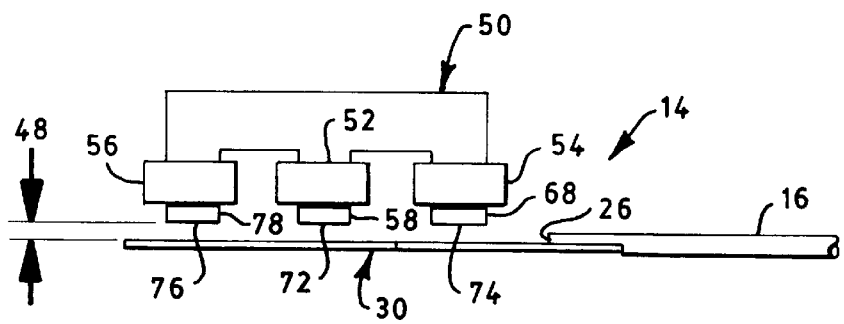
FIG. 5 shows a detailed top view of the transducer of the contour scanner of FIG. 2.

The transducer end 26 of the arm 16 is flattened so as to mate with a projecting portion 32 of a thin, flat high permeability blade 30. The blade 30, in turn, moves relative to the substantially planar faces of the three legs of an E-shaped core 50 that is composed of ferrite or other suitable material. The E-shaped core 50, shown in FIG. 5, together with a plurality of windings 52, 54, 56, one for each leg of the core 50, comprise the measuring means 14, i.e., the unique transducer designed to provide true displacement transducer operation. The blade 30 functions as a movable flux carrier whose slightest relative displacement effectively changes the coupling between the AC-energized primary winding 52 and the secondary windings 54, 56 to control the relative magnitudes of flux produced in the two secondary windings 54, 56. The measuring means 14, therefore, is capable of producing readouts, measuring displacements, with or without traverse motion by the stylus 12. Wires connect the windings to electrical pins 60 and to a potentiometer 70, which is described below. The pins 60 are part of a receptacle 80 designed to receive an electrical plug, not shown, by means of which the probe 10 of the present invention is operatively connected to a surface analysis system of the type as above described.

As described above, the transducers of the prior art use a blade 106 between opposing poles within a set of collinear slots 110. In effect, the blade 106 acts as a barrier for flux lines between opposed poles of the same winding. This is known as a closed measurement loop and must be carefully controlled to operate properly and consistently. The mechanism of the present invention uses an open measurement loop design. In this design, shown in FIGS. 4 and 5, the blade 30 is not positioned in narrow gaps in the core, but outside of the core 50, with an air gap 48 between. This means that the blade 30 is potentially farther from the core 50 itself that the blades of the prior art and less likely to have physical contact with the core 50. The exact position of the blade 30 is much less crucial than for the closed measurement loop transducers of the prior art. As long as the gap 48 between the blade 30 and the core 50 remains constant over the course of a calibration cycle, measurements will be accurate. Preferably, the gap 48 is from approximately 0.0005 inches to approximately 0.010 inches from the core 50, with a most preferred gap 48 of approximately 0.002 inches.

The blade 30 acts to block a portion of the magnetic field from the primary winding 52 and the secondary windings 54, 56, and the amount of blockage of the secondary windings 54, 56 affects the outputs of the secondary windings 54, 56.

Figure 4:
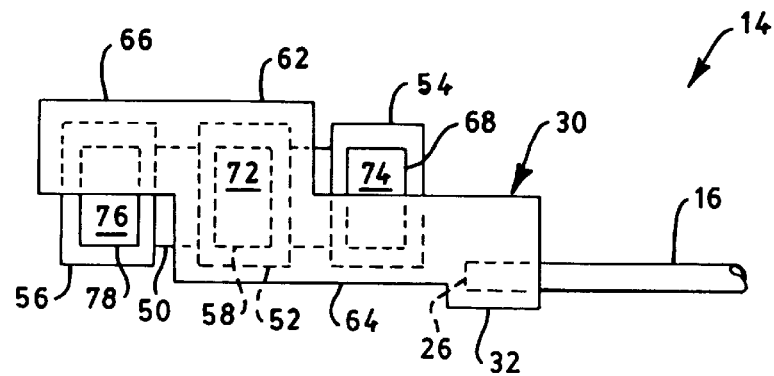
FIG. 4 shows a detailed phantom view of the transducer of the contour scanner of FIG. 2.

As shown in FIG. 4, the blade 30 has three sections, the center section 62 adjacent to the primary winding 52, the inner section 64 adjacent to the inner secondary winding 54, and the outer section 66 adjacent to the outer secondary winding 56. In the blade's nominal, or null measurement, position, there is the same amount of coupling between the primary winding 52 and each of the secondary windings 54, 56 so that there is no difference in the output signal from the two secondary windings. The arm 16 is adjusted as described above so that the inner section 64 "covers" as much of the face 74 of the inner core leg 68 as the outer section 66 covers the face 76 of the outer core leg 78. The center section 62 covers the entire face 72 of the primary core leg 58. As the stylus 12 moves upwardly, the blade 30 moves downwardly, uncovering more of the inner leg face 74 and covering more of the outer leg face 76. The result is less coupling for the inner secondary winding 54 and more coupling for the outer secondary winding 56, leading to a difference in output signals between the two secondary windings 54, 56, which can be measured to determine the displacement of the stylus 12 from its zero position.

The shape of the blade 30 is not critical, only that the inner section 64 and outer section 66 be functional mirror images of each other. The term "functional" is used here because, in reality, the sections will not be physical mirror images. The inner section 64 typically includes a means for attaching the blade 30 to the arm 16, meaning that the inner section 64 will typically be larger than the outer section 66. However, those parts of the blade 30 that extend beyond the boundaries of the core 50 have an insignificant effect on the operation of the transducer 14. It is also preferred that the center section 62 completely cover the face 72 of the primary core leg 58 in all positions of the stylus 12. Calculations are much simpler if they do not have to deal with changes due to movement of the center section 62 across the face 72 of the primary core leg 58.

The fact that the arm 16 pivots means that the blade 30 does not move linearly, but in an arc. Consequently, the change in output between the secondary windings 54, 56 will not be the same for the identical upwardly and downwardly displacements of the stylus 12. The difference, however, can be compensated for in the circuitry or software of the analysis system. Or it may be so small in relation to the displacements that are being measured as to be insignificant and ignored. There are two basic ways that the signal outputs of the secondary windings 54, 56 can be read. In the first, the secondary windings' output signals are independently sent to the measurement circuitry. Any difference between the windings' output signals is determined by the measurement circuitry. In the second and preferred method, the secondary windings 54, 56 are wound in opposite directions and are wired in series, so that there is a single signal sent to the measurement circuitry. When the stylus is in its calibrated zero-displacement position, the secondary windings signal outputs have the same amplitude. However, because they are wound in opposite directions, the output signals are 180° out of phase. So the signals cancel each other out, resulting in a zero signal to the measurement circuitry. As the blade 30 moves, the amplitudes of the two output signals change, and the difference between the amplitudes is determined by the series windings and sent to the measurement circuitry.

Figure 8:
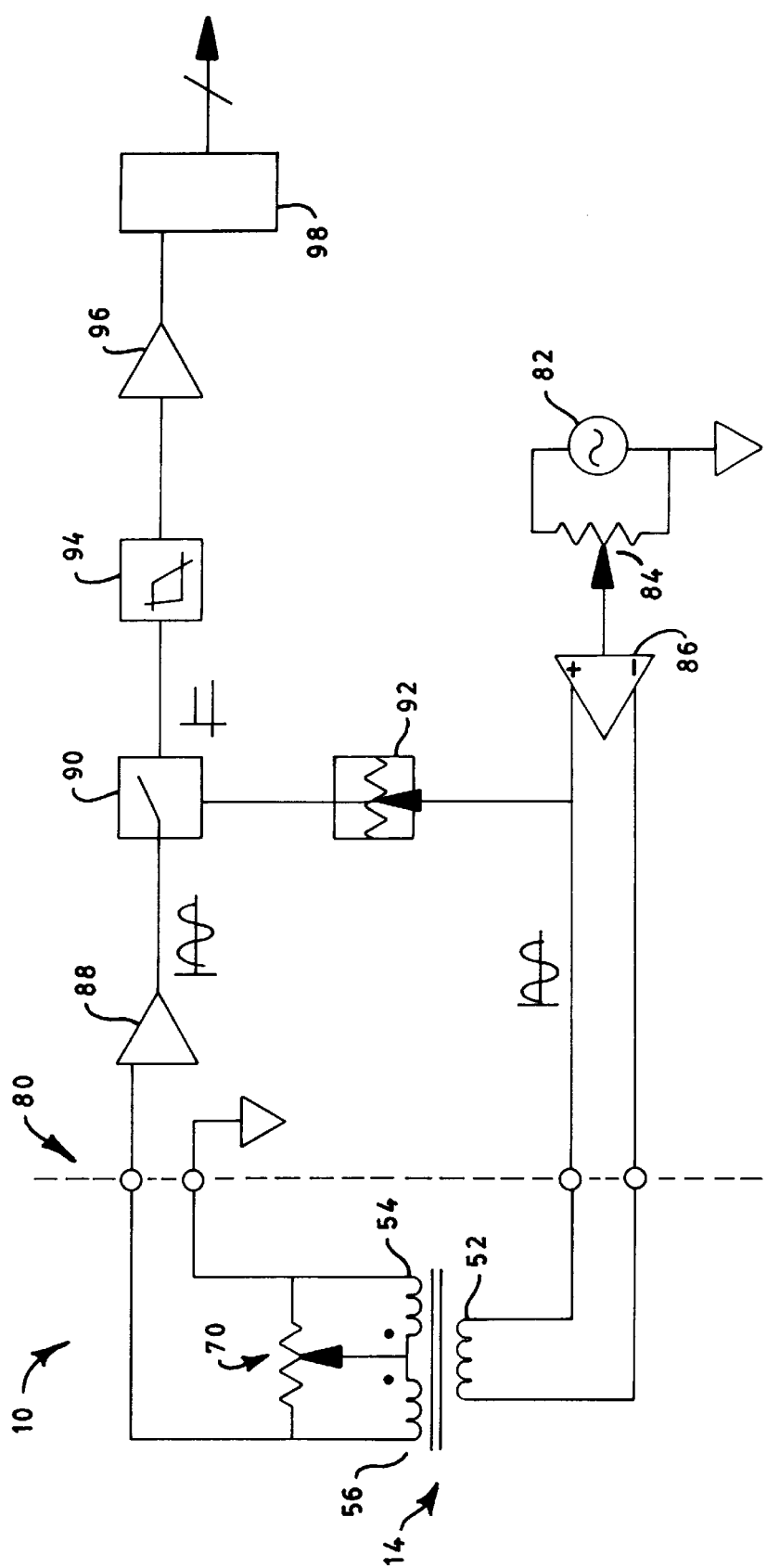
FIG. 8 is a block diagram of the measurement circuit.

The basic measurement circuitry is shown as a block diagram in FIG. 8. An oscillator 82, trimmer 84, and amplifier 86 provides an AC excitation to the primary winding 52. The remainder of the circuit converts the AC output from the series secondary windings 54, 56 to a DC signal for input to a computer for calculation of the surface displacement. The signal from the windings 54, 56 is equalized by the potentiometer 70 at the probe 10. The signal from the probe 10 is first amplified by an amplifier 88. Next it is demodulated by a demodulator 90 using the excitation signal through a phase adjuster 92 as a reference. The DC signal is sent through a low-pass filter 94 to remove any high-frequency signals. The arm 16, being a mechanical device, as a limit to the speed at which it can move, which means that the signal output of the transducer 14 will only change at a rate of speed that is relatively low. Consequently, any signals above a certain threshold, A surface finish, displacement and contour scanner typically about 300 Hz, are presumed to be caused by noise. The filtered DC signal is passed through an amplifier 96 and sent to an analog-to-digital converter 98 for input to a computer.

Thus it has been shown and described a surface finish, displacement and contour scanner which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A surface finish, displacement and contour scanner comprising:

(a) a housing and an arm pivotally mounted to said housing;

(b) a stylus mounted to said arm and having a displacement from a null position fixed relative to said housing;

(c) a transducer for measuring said displacement, said transducer including an E-shaped core mounted to said housing and a blade affixed to said arm;

(d) said core having a central primary core with an alternating-current-energized winding producing a magnetic field, a first secondary core with a first winding, and a second secondary core with a second winding, each of said primary core and said secondary cores having an open face, all of said open faces being in a substantially single plane;

(e) said blade being positioned adjacent to said open faces, substantially parallel to said plane, and with a gap between said blade and said open faces;

(f) said blade blocking a portion of said magnetic field from said first secondary core, affecting a first output signal from said first winding, said blade blocking a portion of said magnetic field from said second secondary core, affecting a second output signal from said second winding, said portions being dependant upon said displacement;

(g) whereby said first output signal and said second output signal are used in determine said displacement.

2. The surface finish, displacement and contour scanner of claim 1 wherein said stylus is affixed to a first end of said arm, said blade is affixed to a second end of said arm, and said pivotal mounting is between said stylus and said blade.

3. The surface finish, displacement and contour scanner of claim 1 wherein said gap is in the range of approximately 0.005 inches to approximately 0.010 inches.

4. The surface finish, displacement and contour scanner of claim 1 wherein said blade includes three sections, a center section completely covering said primary core face, a first section covering approximately half of the area of said first secondary core face when said stylus is in said null position, and a second section covering approximately half of the area of said second secondary core face when said stylus is in said null position, the amount of area of said first secondary core face covered by said first section changing in opposition to the amount of area of said second secondary core face covered by said second section as said displacement changes.

5. The surface finish, displacement and contour scanner of claim 1 wherein said first output signal and said second output signal are of substantially equal magnitude when said stylus is in said null position.

6. The surface finish, displacement and contour scanner of claim 1 wherein said first winding and said second winding are wound in opposite directions.

7. A surface finish, displacement and contour scanner comprising:

(a) a housing and an arm pivotally mounted to said housing;

(b) a stylus mounted to said arm and having a displacement from a null position fixed relative to said housing; and (c) a transducer for measuring said displacement, said transducer including an E-shaped core mounted to said housing and a blade affixed to said arm;

(d) said core having a central primary core with an alternating-current-energized winding producing a magnetic field, a first secondary core with a first winding, and a second secondary core with a second winding, each of said primary core and said secondary cores having an open face, all of said open faces being in a substantially single plane, said first winding and said second winding being wound in opposite directions;

(e) said blade being positioned adjacent to said open faces, substantially parallel to said plane, and with a gap between said blade and said open faces;

(f) said blade blocking a portion of said magnetic field from said first secondary core, affecting a first output signal from said first winding, said blade blocking a portion of said magnetic field from said second secondary core, affecting a second output signal from said second winding, said portions being dependant upon said displacement;

(g) said blade including three sections, a center section completely covering said primary core face, a first section covering approximately half of the area of said first secondary core face when said stylus is in said null position, and a second section covering approximately half of the area of said second secondary core face when said stylus is in said null position, the amount of area of said first secondary core face covered by said first section changing in opposition to the amount of area of said second secondary core face covered by said second section as said displacement changes; and (h) said first output signal and said second output signal being of substantially equal magnitude when said stylus is in said null position;

(i) whereby said first output signal and said second output signal are used in determine said displacement.

8. The surface finish, displacement and contour scanner of claim 7 wherein said stylus is affixed to a first end of said arm, said blade is affixed to a second end of said arm, and said pivotal mounting is between said stylus and said blade.

9. The surface finish, displacement and contour scanner of claim 7 wherein said gap is in the range of approximately 0.005 inches to approximately 0.010 inches.

* * * * *